United States Patent [19]

Betts et al.

[11] Patent Number: 4,578,723
[45] Date of Patent: Mar. 25, 1986

[54] HEAD POSITIONING SYSTEM WITH AUTOMATIC GAIN CONTROL

[75] Inventors: Alan J. Betts, Romsey; Peter J. Elliott, Alresford, both of United Kingdom

[73] Assignee: International Business Machines Corporation, Armonk, N.Y.

[21] Appl. No.: 504,552

[22] Filed: Jun. 15, 1983

[30] Foreign Application Priority Data

Jun. 18, 1982 [EP] European Pat. Off. ........ 82303179.4

[51] Int. Cl.⁴ .......................... G11B 21/10; G11B 5/02
[52] U.S. Cl. ........................................ 360/77; 360/67; 318/677
[58] Field of Search ...................... 360/77, 78, 46, 67; 318/606, 608, 677, 620, 615–619

[56] References Cited

U.S. PATENT DOCUMENTS

| | | | |
|---|---|---|---|
| 3,593,333 | 7/1971 | Oswald | 360/77 |
| 3,691,543 | 9/1972 | Mueller | 360/77 |
| 3,818,502 | 6/1974 | Chien et al. | 360/77 |
| 4,297,734 | 10/1981 | Laishley | 360/77 |
| 4,326,226 | 4/1982 | Touchton et al. | 360/77 |
| 4,415,939 | 11/1983 | Ballard | 360/77 |

FOREIGN PATENT DOCUMENTS

| | | | |
|---|---|---|---|
| 1314695 | 4/1973 | United Kingdom | 360/77 |
| 1489078 | 10/1977 | United Kingdom | 360/77 |

OTHER PUBLICATIONS

IBM TDB, vol. 18, No. 8, "Null Servo Pattern", Betts, Jan. 1976, pp. 2656-2657.
IBM TDB, vol. 20, No. 1, "Off-Track Gain Calibration of Position Error Signal", Palmer, Jun. 1977, pp. 349-350.
IBM J. Res. & Devel., Nov. 1974, pp. 506-512, "Design of a Disk File Head-Positioning Servo", Oswald.

Primary Examiner—Donald McElheny, Jr.
Assistant Examiner—Steven R. Garland
Attorney, Agent, or Firm—Walter J. Madden, Jr.; Thomas R. Berthold

[57] ABSTRACT

A head positioning system with automatic gain control for use in disk information storage apparatus employs multiphase radial position error signals derived from position reference information on the disk to control the position of a transducing head by means of a head positioning actuator. A variable gain amplifier amplifies the signals from the transducing head prior to their application to a position error signal generating means. The gain of the amplifier is controlled in a gain control loop by a gain function. The gain function is derived by combining the differnet phase position error signals to provide, at any position of the head, a measurement of the rate of change of the position error signals per track of displacement. This system affords gain control which is substantially independent of head width and limits variations in offtrack gain between heads.

10 Claims, 18 Drawing Figures

HEAD POSITIONING SYSTEM WITH AUTOMATIC GAIN CONTROL

CROSS REFERENCE TO RELATED APPLICATIONS

Reference is made to copending application Ser. No. 504,764, filed June 15, 1983, now U.S. Pat. No. 4,511,938, for a "Magnetizable Recording Disk and Disk File employing Servo Sector Head Positioning".

TECHNICAL FIELD OF THE INVENTION

The present invention relates to head positioning systems with automatic gain control, for use in disk information storage apparatus.

BACKGROUND ART

The storage of digital or analog information on rotating disk media is well known. Particularly common, in data processing applications, is the magnetic disk file in which information is written on and read from concentric tracks on the disks by electromagnetic transducing heads supported adjacent the disk surfaces. At typical state-of-the-art track densities of, say, 10 tracks/mm, such a disk file must be provided with position reference information which is employed by a head positioning servo system to position and maintain the head precisely over a selected track of an associated disk. The operation of maintaining the head over a desired track is known as "track following" whereas that of moving the head between tracks is known as "track accessing". Both these operations make use of such position reference information.

In some disk files, position reference information is provided remotely from the disk surface on which the data to be processed is stored e.g. on a dedicated servo disk or disk surface. A general description of a disk file employing this type of head positioning system is given in an article entitled "Design of a Disk-File Head-Positioning Servo" by R. K. Oswald (IBM J. Res. Develop., September 1974, p 506). This type of system has the advantage that position reference information is continuously available. However, at higher track densities, such an arrangement has the disadvantage that it is difficult to guarantee registration between the remote position reference information and the information storage tracks of the disk.

To overcome this disadvantage, it is also known to provide position reference information in sectors, known as "servo sectors", on the information storage surface. These servo sectors are interspersed with "data sectors" containing the stored information and provide accurately registered position reference information on a sampled basis as the disk rotates. UK patent No. 1,314,695 entitled "Position Control System" describes such a system.

Both the dedicated servo system of the above referenced article and the sampled system of the referenced patent employ the common principle that the position reference information contains contiguous servo tracks of two alternating types whose boundaries each, nominally, coincide with the centre of a data track. Signal contributions from each type of servo track, as detected by the transducing head, are inherently distinguishable from each other. Demodulating circuitry separates these components from each other and derives a position error signal from the difference in their amplitudes. This position error signal varies cyclically with radial displacement of the head across the tracks. It is, ideally, linear between slope reversals and is zero when the head lies equally over the boundary of an adjacent pair of servo tracks.

In practice, the simple difference, $(p-q)$ between the contributions, p and q, from different servo tracks, is not an accurate indication of displacement from the servo track boundary because, for one reason, the flying height of the head is different at different radial positions over the disk and this affects the amplitude of the detected signals. To overcome this problem, both the above referenced documents propose that the sum $(p+q)$ of the contributions from a pair of servo tracks also be determined separately. Since $(p+q)$ corresponds to the full width response of the head, it is a constant quantity and may be used to normalise the amplitude of the position error signal. The value of the position error signal is thus given by $(p-q)/(p+q)$ multiplied by a constant. This technique is effected by means of automatic gain control of a variable gain amplifier to which the signals detected by the head are applied. The gain control signal is derived from a comparison of $(p+q)$ with a reference value and is fed back to control the gain of the amplifier.

An alternative arrangement of position reference information, known as a "null" pattern is shown in an article entitled "Null Servo Pattern" by A. J. Betts (IBM Technical Disclosure Bulletin, Vol. 18, No. 8, January 1976, p 2656). This pattern again employs alternating servo tracks but with time coincident transitions of opposite magnetic polarity. When a transducing head is located over the boundary between two such tracks, it is subject to equal and opposite magnetic flux changes so that the net output signal is zero. When the head is off-centre, the flux changes are not equal and a net error signal results. With this arrangement, the contributions of each track to the head output signal are not separately identifiable as they are combined in the head itself. Consequently, the response of the head cannot be normalised by means of signals derived from the position reference information. For this reason, a separate gain field of alternating unipolar transitions is provided, which precedes the position reference information. The signals detected by the head from the gain field represent the maximum amplitude response of the head to a transition and can thus be averaged and employed to normalise the subsequent position error signals.

Figures 9, 11:
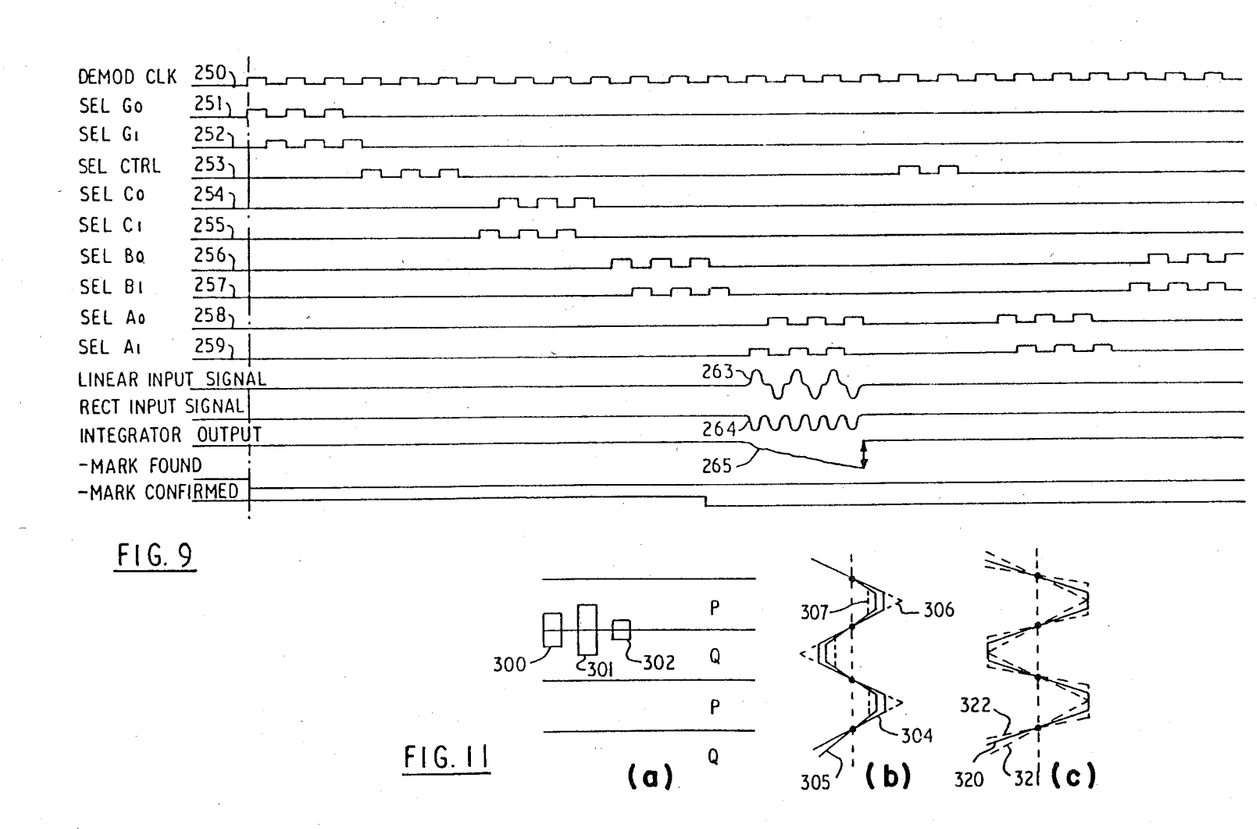
FIG. 9 illustrates the waveforms of various timing signals occurring in the demodulator of FIG. 8 together with representative waveforms illustrating the demodulation of analog input signals from the transducing head.
FIG. 11, in part (a) illustrates four servo tracks with different alternating signals "P" and "Q" and three transducing heads of different widths, in part (b) the different waveforms for the signals (P−Q) for the different heads at different flying heights, and in part (c) the waveforms corresponding to the waveforms in part (b) normalized by the conventional automatic gain control technique.

Although the above described automatic gain control techniques will standardise the response of different heads to some extent, they do not do so adequately in cases where the widths of the heads vary. Such variations become more likely at high track densities because the width of the transducing head must be decreased to the extent that its dimensions are difficult to control. In the case of electromagnetic transducing heads, the effective width of the head may be greater than the physical gap width because of the effect of fringing fields. In these circumstances, to avoid crosstalk, it is important that the physical widths of all data heads are significantly less than the data track widths. Furthermore, for reasons elaborated in our European Patent Application "Magnetizable Recording Disk and Disk File employing Servo Sector Head Positioning" (A. J. Betts and P. J. Elliott), filed concurrently herewith, a deliberate choice of a head width which is only a fraction of the servo track pitch may be desirable. Particularly, where narrow data heads are used to read sector servo position reference information, large variations in off-track response can arise if the conventional AGC approach is employed. Such variations in position error signal slope for heads of different widths, to which conventional AGC has been applied, are illustrated in FIG. 11 and discussed in detail in the following section entitled "Disclosure of the Invention".

This problem has been recognised in the art, in the context of a dedicated servo file, and a solution is proposed in an article entitled "Off-track gain calibration of position error signal" by R. S. Palmer (IBM Technical Disclosure Bulletin Vol. 20, No. 1, June 1977, p 349). This article shows a servo pattern in which four radially overlapping but time separated servo signals "A, B, C and D" are employed, the contiguous boundaries of A and B and of C and D defining two data track centres. A conventional AGC circuit uses the sum A+B+C+D to control a variable gain amplifier. To adjust off-track gain, special calibration track portions are written in which signals A and B are separated by equal and opposite sinusoidally varying distances from the data track centre line. This affects the head response in the same way as a movement off track. The response is averaged and applied as a second control signal to the variable gain amplifier, thereby standardising the off track gain.

To compleFte the review of the prior art, reference is also made to UK patent No. 1,489,078 in which problems of asymmetry in magnetic heads or servo channels are overcome by separate adjustment of variable gain amplifiers in dual servo channels for demodulating the signals from respective contiguous servo tracks. The solution involves writing the servo tracks in a serpentine form so that their boundary defines a serpentine path. At normal disk operating speeds, the sinusoidal modulation of the head output signal is of such high frequency that it does not affect the normal track following operation which is handled by a lower bandwidth feedback loop employing separate channels for each of the two servo track types. The high frequency components, corresponding to the sinusoidal modulation, are filtered out from the separate channels by high frequency filters. The average amplitude of the high frequency filtered signal is employed to control the variable gain amplifier in each channel thereby overcoming problems of asymmetric response.

DISCLOSURE OF THE INVENTION

The problems of off-track gain variation in the head positioning system of a magnetic disk file have therefore been recognised in the prior art. FIG. 11 illustrates, in general terms, the effect of a conventional AGC loop, in a variety of circumstances. Four rows of position reference information of alternating type, P and Q, are shown together with three heads, 300, 301 and 302. Head 301 is assumed to have an effective width exactly equal to the row width whereas heads 300 and 302 have widths of $\frac{2}{3}$ and $\frac{1}{3}$ of a row respectively.

Waveform 304 represents the idealised variation of the difference (p−q), between signal contributions from track P and Q detected by head 300 at one flying height as the head moves orthogonally across the tracks. Waveform 305 represents the same difference function detected by head 300 at a different flying height and illustrates the need for conventional gain control circuitry. The waveform 320 in the right hand diagram illustrates the effect of conventional automatic gain control circuitry in normalising the waveforms 304 and 305 by means of the function (p−q)/(p+q) as described above.

The waveforms 306 and 307 from heads 301 and 302, representing the absolute difference (p−q), differ from waveform 304 as shown by the dotted line portions, assuming an identical flying height and head response. However, if these waveforms 306 and 307 are normalised by means of the algorithm (p−q)/(p+q), the result is waveforms 321 and 322. These it can be seen have the correct values at "on track" and $\frac{1}{2}$ track (maximum) deviations but do not have the correct slope in between. Thus, if the conventional algorithm is employed with heads of different widths, the "off-track gain" is not of constant slope even though its variation is linear.

In the head positioning system of one known disk file, as described in an article "Servo Design for an Eight-Inch Disk File" by R. D. Commander and J. R. Taylor (IBM document no. GA26-1665-0, February 1980, p. 90), the off-track gain variation at track densities of 18 tracks/mm has been found to be ±20%. At higher densities still, this variation will be even greater, representing a particularly severe problem for a sector servo disk file where the servo tracks are, necessarily, read by data heads of less than one data track width. Excessive variation in off-track gain can produce under- or over-correction and instability in a high density track-following servo system where the highest possible track following loop gain is needed to position the head very accurately over the selected track and to minimise off-track deviations.

Off-track gain variation can also cause problems in track accessing servo systems, such as, for example, that described in European Published Patent Application No. 0013326. In that system, the access control requires that position error signals, derived from servo sectors, are sampled throughout the access motion and compared with a continually available model position error signal of the same general form. The difference between the sampled actual and model position error signals, known as the Access Position Error, is fed back to control the access motion. Clearly, it is important that the sampled position error signals are linear and of substantially constant off-track gain, irrespective of which of a number of transducing heads on different disk surfaces they come from.

These and other problems are solved by the present invention which provides a head positioning system with automatic gain control, for use in disk information storage apparatus, comprising: a head positioning actuator for moving at least one transducing head transversely of concentric information storage tracks on one of the disk surfaces; position reference information on one of the disk surfaces for defining the radial position of the information storage tracks, the position reference information having a circumferentially extending and radially repeated pattern including at least two radially offset subsets of elements; a transducing head, movable by the actuator, for detecting the position reference information and producing signals representative thereof; a variable gain amplifier for amplifying the signals from the transducing head; position error signal generating means arranged to receive the amplified signals from the variable gain amplifier and to generate from them, corresponding to each subset of the position reference information, a respective phase of radial position error signal whose variation with radial displacement is cyclical and related to the pitch of the tracks; and feedback means for feeding back a composite position error signal, derived from the multi-phase position error signals, to control the head positioning actuator; the system being characterised by: a gain function generating means arranged to combine the different phase position error signals, to provide, at any position of the head, a gain function which is a measurement of the rate of change of the position error signals per track of displacement; and a gain control loop for controlling the gain of the variable gain amplifier in dependence on the gain function so as to tend to keep the measured rate of change substantially constant.

Unlike conventional automatic gain control which is based on the full width response of the head and takes no account of variation in head width, the system of the present invention affords gain control which is substantially independent of head width. Furthermore, by making use of all the information available from multi-phase position error signals to construct a gain function, the off-track gain can be closely controlled without recourse to the additional calibration tracks suggested in the above referenced Palmer article or the track shape modulation suggested in UK patent No. 1,489,078. By means of the present invention, off-track gain variation in a multi-head multi-disk sector servo disk file employing track densities greater than 18 tracks/mm has been kept to within ±5%.

In practice, each of the multi-phase position error signals will be substantially linear within only a restricted portion of each cycle and will deviate from linearity over the remainder of the cycle. In this case, it is preferred that the system further includes correction means for providing a correction signal to the gain function generating means for combination with the selected portions of the different phase position error signals whenever one of the position error signals which is being combined is in a non-linear portion of a cycle.

This correction value, known as the "k-value", compensates for a shortfall in the gain function due to non-linearity. It is further preferred, in a multi-head file, that the system further includes a store responsive to head address information to provide a first output signal whose value is related to the width of the selected head, the correction means being responsive to the first output signal to vary the correction signal by a predetermined amount. In this latter case, it is also preferred that the first output signal from the store is also applied directly to the gain control loop. This feature provides a faster adjustment of gain than would be achieved by feedback of the gain function alone.

In systems where the heads are divided into inner and outer groups, a faster adjustment of gain can be achieved if the store provides a second output signal, indicative of whether the selected head is an inner or an outer head, directly to the gain control loop.

The principles of this invention as most broadly defined are not restricted to servo sector files. However, where a servo sector file is employed, the bandwidth of the gain control loop may be too low to permit reasonably fast control of the gain. In this case, it is preferred that each servo sector comprises gain reference information preceding the position reference information and detectable by the transducing head and that the system comprises a further gain control loop of higher bandwidth including a gain reference information amplitude detector whose output is a measure of the full width response of the transducing head to information signals on the disk. The output signals from both loops are then combined to control the gain of the variable gain amplifier.

This system has the advantage that a fast initial adjustment of signal amplitude can be made, by the high bandwidth loop during a servo sector, prior to the demodulation of the position reference information. A finer adjustment of off-track gain is made by the low bandwidth loop in dependence on the gain function derived from the preceding sector.

Although the invention is applicable to any multi-phase system, the preferred head positioning system is a three phase one in which two of the three position error signals are always nominally linear while the third is non-linear. By comparing the magnitudes of the three phase signals, selection signals can be generated to cause the gain function generating means to combine the moduli of those pairs of position error signals which are in their nominally linear region.

This is preferably effected by employing two switching circuits, to each of which the three phase position error signals are applied, and arranging the selection logic to cause the switching circuits to output different respective ones of the three phase signals sequentially at each quarter track position.

The output of one of these switching circuits is preferably the composite position signal whose modulus is applied together with a constant amplitude correction signal (the "K" value) to a maximum value selection circuit. This circuit passes whichever is the greater of these two signals to the gain function generating means for combination with the phase position error signal selected by the other switching circuit. In this way, the correction value is only applied when the deviation from linearity of one of the signals being combined exceeds a predetermined threshold.

DETAILED DESCRIPTION OF INVENTION

Figure 1:
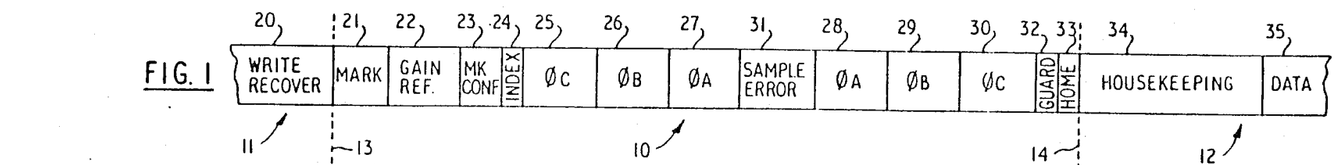
FIG. 1 shows the format of the servo sectors on a magnetizable recording disk according to the present invention, together with portions of adjacent data sectors.

FIG. 1 illustrates a preferred format of a servo sector 10 and portions of neighbouring data sectors 11 and 12 on a magnetizable record disk. The servo sector 10 is delimited by lines 13 and 14. Although drawn rectilinearly for convenience, it will be realized that the band of servo and data sectors shown in FIG. 1 is, in fact, arcuate and concentric with the disk, the lines 13 and 14 being radii of the disk.

At the end of each data sector is an area 20, known as the Write Recovery field, which contains no User data but enables readback circuitry for processing signals, read back by a transducing head from the disk, time to recover from disturbances resulting from any recording (writing) of data in that sector. Each Write Recovery field 20 is followed by a Mark field 21 which is uniquely coded to indicate the start of a servo sector, 10.

As the disk rotates, the next area of the servo sector to be encountered by the head is a Gain Reference field 22 for providing reference signals to enable automatic gain control circuitry to standardize the signals detected by the head, as will be described below. Following the Gain Reference field is a Mark Confirm field 23, which enables verification of the preceding Mark 21. The Mark Confirm field is followed by Index bit 24. A predetermined value of the Index bit indicates that the head is located at a unique circumferential position over the disk.

Following the Index bit, are three zones 25-27 of position reference information for defining the radial position of data tracks on the disk. Each zone provides a different phase $\phi_C$, $\phi_B$ or $\phi_A$ of position reference information. The three phases of position reference information are repeated in reverse order in three further zones 28-30. In between these two regions of position reference information is a Sample Error field 31 which indicates the validity of the position reference information in that particular sector.

At the end of the servo sector 10, following the repeated position reference information are two further code bits. One of these is the Guard bit, 32, whose value indicates whether a given track is within the normally available band of data tracks or lies in a Guard Band region at the boundary of the data tracks. A Home bit, 33, is coded to indicate a unique track known as the Home track (track number 0) which is normally the first of the data tracks available to a User.

The servo sector 10 terminates at line 14, following the Home bit 33, and is followed by the next data sector 12. Area 34 of the data sector contains initialising and housekeeping information and is followed by an area 35 in which User data may be recorded.

Figure 2:
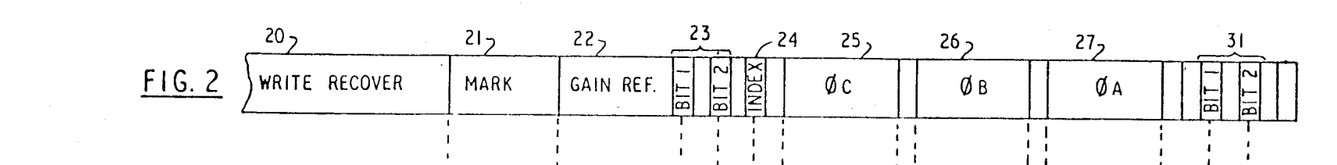
FIG. 2 shows part of the format of FIG. 1 in somewhat more detail.
Figure 3:
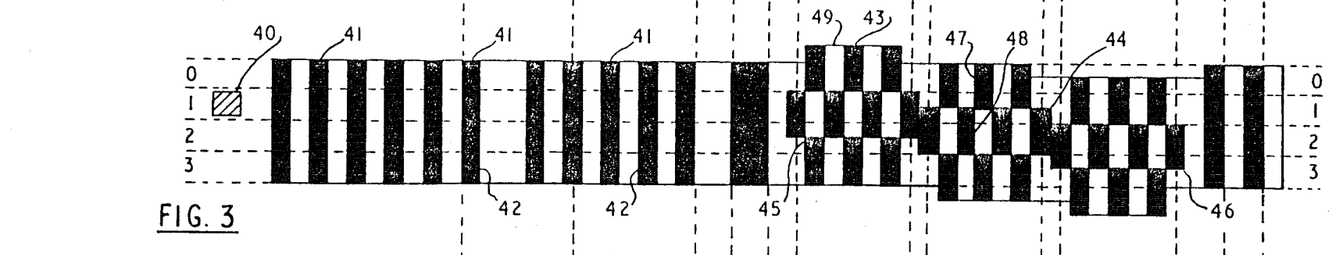
FIG. 3 shows the detailed pattern of magnetization constituting the format of FIG. 2.
Figure 4:
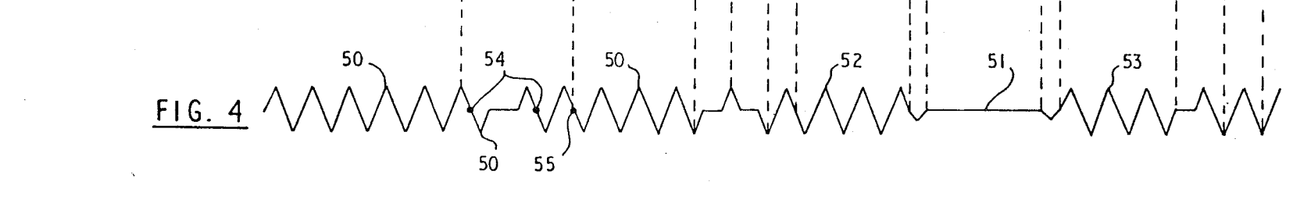
FIG. 4 illustrates the waveform of a signal detected by an associated magnetic transducing head during relative motion of the head across the magnetization pattern of FIG. 3.

A portion of the format of FIG. 1 is repeated, with slightly more detail, in FIG. 2. FIG. 3, which is aligned with FIG. 2, illustrates the actual magnetization of a portion of a typical servo sector over a small band of data tracks numbered 0 to 3. The dimensions of a typical transducing head 40, positioned over track 1, are illustrated in outline. The waveform of the signal detected by head 40 as the magnetization pattern of FIG. 3 passes the head is shown in FIG. 4, also aligned with FIGS. 2 and 3. The waveform is somewhat idealized to emphasize its significant characteristics. In practice, the peaks would be rounded and the intervening portions less linear than shown.

In drawing the magnetization pattern of FIG. 3, the black areas indicate magnetic polarization in a first direction (say, from left to right) and the white, or unmarked, areas indicate magnetic polarization in the opposite direction. It should be realized that all areas of the servo sector are magnetized to saturation in one of these directions or the other and there are no unmagnetized areas.

Considering again, briefly, the various portions of the data and servo sectors shown, it will be observed that the Write Recovery Field 20, the Mark 21, the Gain Reference Information 22, the Mark Confirm bits and the Index 24 all consist of radial bars of magnetization of alternating polarity. These extend across the entire surface of the disk between the inner and outer diameters of its usable area. The signal detected by the head in passing over these regions has peaks 50 which correspond to the transitions 42 from one polarity to the other. The position and sense of these peaks is fixed in every servo sector though, of course, their amplitudes may vary. The Sample error field 31, however, consists of a pair of bits which may be differently encoded in respect of different tracks. In the state shown in FIG. 3, the Sample error bits indicate that the position reference information is good.

The position reference information zones 25, 26 and 27 each comprise a subset of radial bar elements 43 alternating with bars 49 of the opposite polarity. The bar elements 43 and 49 extend radially over one and a half data track widths. The subsets are radially offset from each other by one-half of the data track width. This pattern of position reference information extends circumferentially across the sector, as shown, and is repeated radially across the usable area of the disk. To illustrate the offset between the phases most clearly only three rows of elements have been shown for each phase.

Every alternate boundary, such as 44, 45 or 46, between adjacent rows, or bands, of elements in a subset defines the centre of a corresponding data track, in this case of tracks 1, 2 and 3. In each subset, the bar elements 43 of like polarity are offset circumferentially from each other in alternate rows by the width of an element to form a servo pattern of the known "null" type in which equal and opposite elementary transitions, such as 47 and 48, are aligned in adjacent rows.

Thus when the signal detected by head 40, passing over any of the position reference information in phase zones 25, 26 or 27, is zero, the head is aligned either with a data track centre or with a data track boundary. Which of a group of three adjacent data tracks the head is positioned over depends on which of the three phase signals is zero. In the example shown, the signal from head 40 is zero, as shown by portion 51 of FIG. 4, when passing over the boundary 44 of the $\phi_B$ phase pattern, corresponding to the centre of track 1. When the head 40 passes over the $\phi_A$ and $\phi_C$ phase patterns, the corresponding signal has the waveform shown in portions 52 and 53. The peak amplitude of these signals indicates that head 40 is displaced by at least one-half track width from the nearest row boundaries of the $\phi_C$ and $\phi_A$ phases i.e. the head does not straddle these boundaries at all. At any position other than alignment with a row boundary, the signal from head 40 would comprise an alternating peaked waveform, similar to portions 52 and 53 but of lesser amplitude.

Accordingly, either the peak amplitudes or the areas under the signal portions 51, 52 and 53 can be used to provide a measurement of position error from their respective track centres. As will be described in connection with FIGS. 6 and 7, the more reliable area demodulation technique is employed and signal portions 51, 52 and 53 are separately rectified, integrated and gain adjusted, as also are the corresponding signal portions derived from the reversed zones 28, 29 and 30, to provide the three phases of position error signal shown in FIG. 5.

Figure 5:
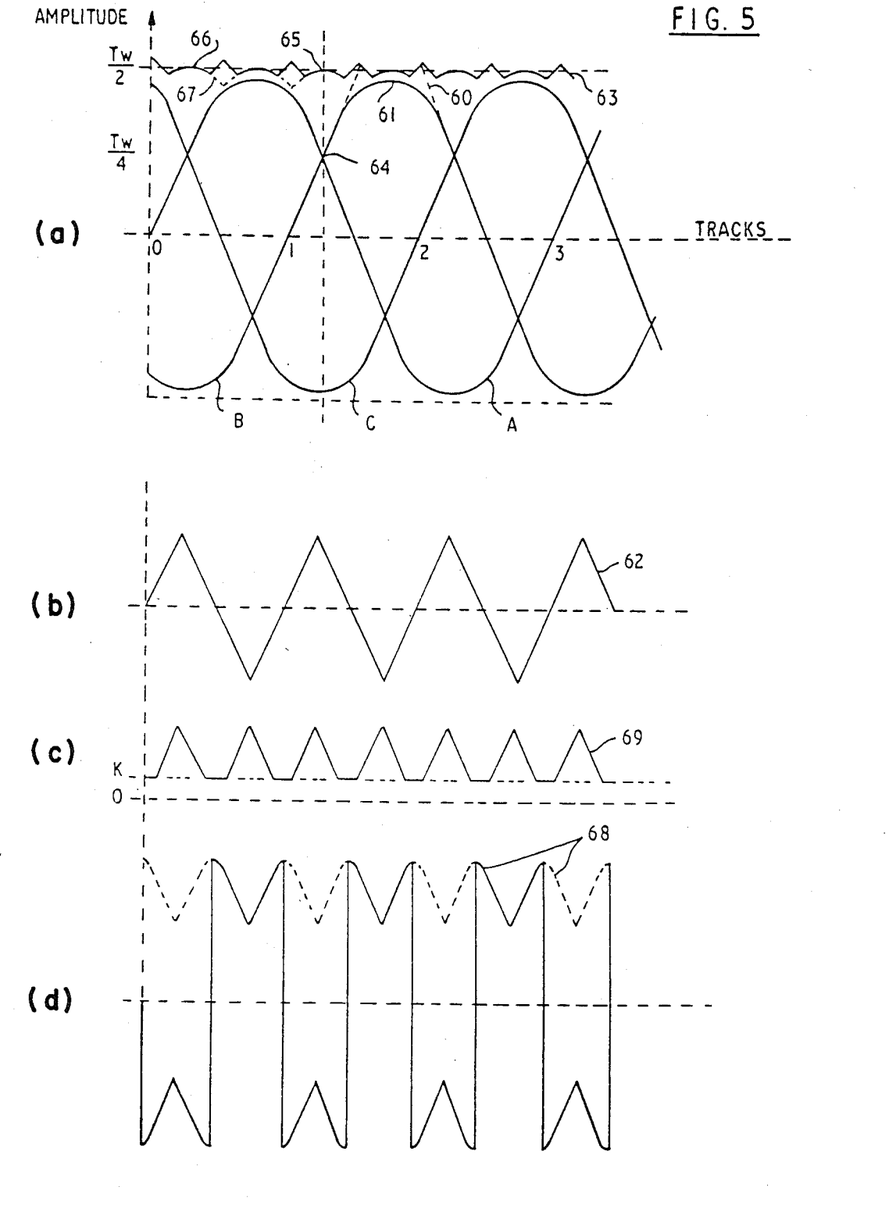
FIG. 5 shows, in part (a) the three phase position error signals derived from the signal of FIG. 4 and the gain function signal for controlling the gain of the variable gain amplifier, in part (b) the composite position error signal which is a combination of the linear portions of the three position error signals shown in part (a), in part (d) the output of modulus circuit 207 as shown in FIG. 11, and in part (c) a signal representative of the larger of a constant value "K" and the composite position error signal of part (b)

In FIG. 5, the variation of amplitude of the demodulated position error signals A, B and C, from $\phi_A$, $\phi_B$ and $\phi_C$ phase patterns respectively, is shown over tracks 0 to 3. It can be seen that this variation is cyclical and that each phase signal repeats itself over three tracks. Because the radial width of the bar elements, such as 43 and 49, making up the position reference information is significantly greater than the physical width of the head 40 (and of the data tracks), the sensitive width of the head, which is a combination of its physical width and its magnetic fringing field, is sufficiently small with respect to the width of the rows of elements making up the position reference information that the head is relatively little affected by crosstalk from neighbouring rows which could significantly reduce the amplitude or linearity of the signal. Consequently, the resultant position error signals A, B and C are extremely linear, particularly over a range of $\pm\frac{1}{4}$ track from the track centre, and are approximately linear even beyond that.

Beyond this range, each phase of position error signal, as indicated by the dashed line 60, would, ideally, remain linear until the half track point. It would then be of constant amplitude over the next half track, corresponding to the head lying wholly within the radial bounds of one of the rows of elements, and, at the next track centre, would start to vary linearly again with the opposite slope. In practice, the effect of the fringing field is to round and lower the signal as shown by portion 61. Different heads, in a multi-head file, produce different degrees of rounding depending on both the physical and the effective widths of the head. However, it has been found that the derived position error signals are substantially linear within the $\pm\frac{1}{4}$ track regions mentioned although the signals from different heads do not necessarily have the same slope. Thus, for any particular head a substantially linear position error signal can be selected from one of the three phase signals at any radial position of the disk.

Figure 6:
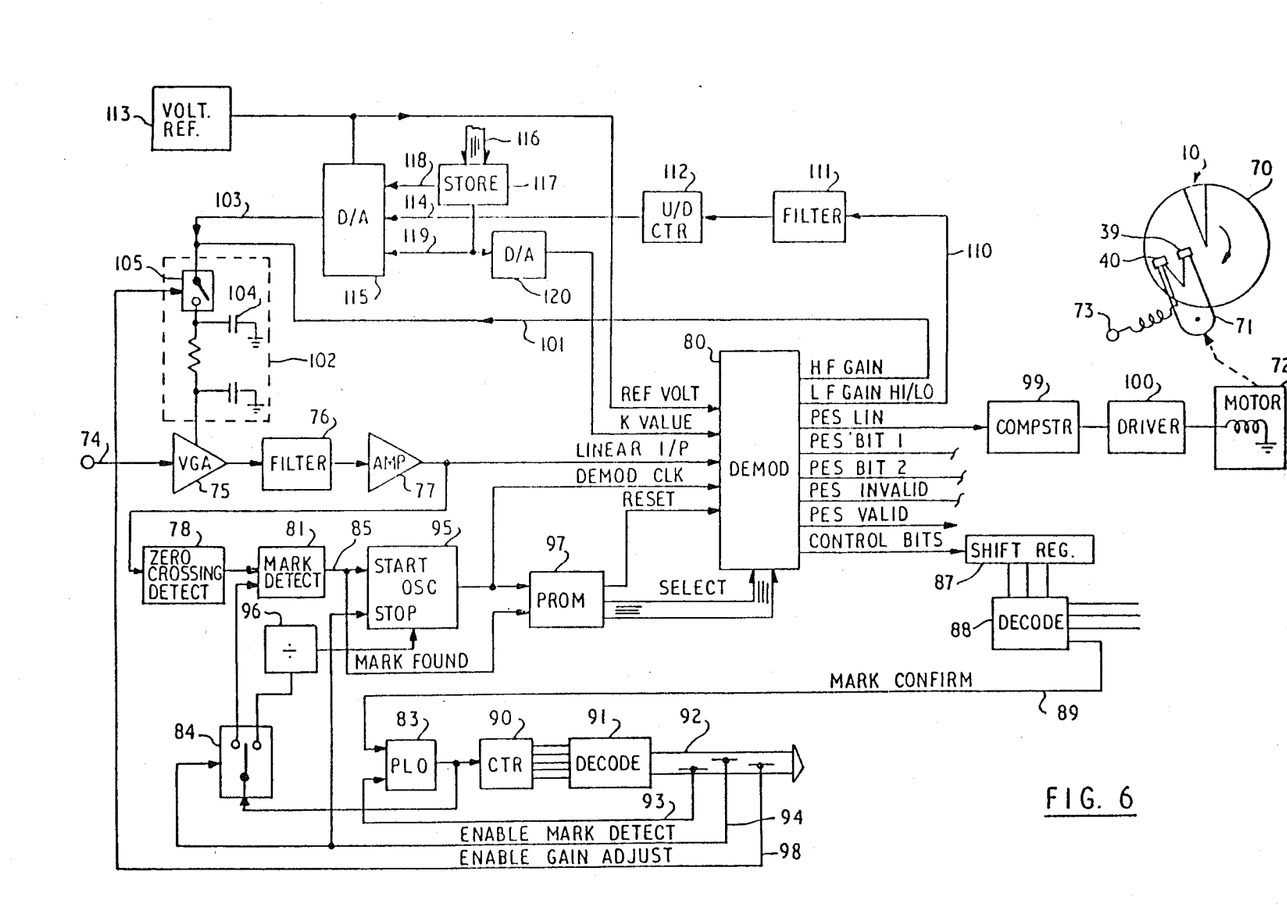
FIG. 6 illustrates schematically a head positioning system forming part of a disk file according to the present invention.

A head positioning system for positioning transducing heads over the surface of an information storage disk is shown in FIG. 6. As illustrated, a disk 70 includes on its surface position reference information in servo sectors 10 of the type illustrated in FIGS. 1 to 3, only one of which is shown. The disk is rotated in the direction of the arrow past transducing heads 39 and 40 covering inner and outer areas of the disk, respectively. The heads are mounted on a head support arm 71 which is rotatable about the axis shown, by an actuator motor 72. The remainder of the head positioning system consists of a signal processing channel for processing signals received from a selected one of the heads of the disk file. Although portions of this channel are common to both servo and data signal processing, it is primarily those components associated with the processing of the servo sectors 10 of FIG. 1 which are illustrated.

Figure 8:
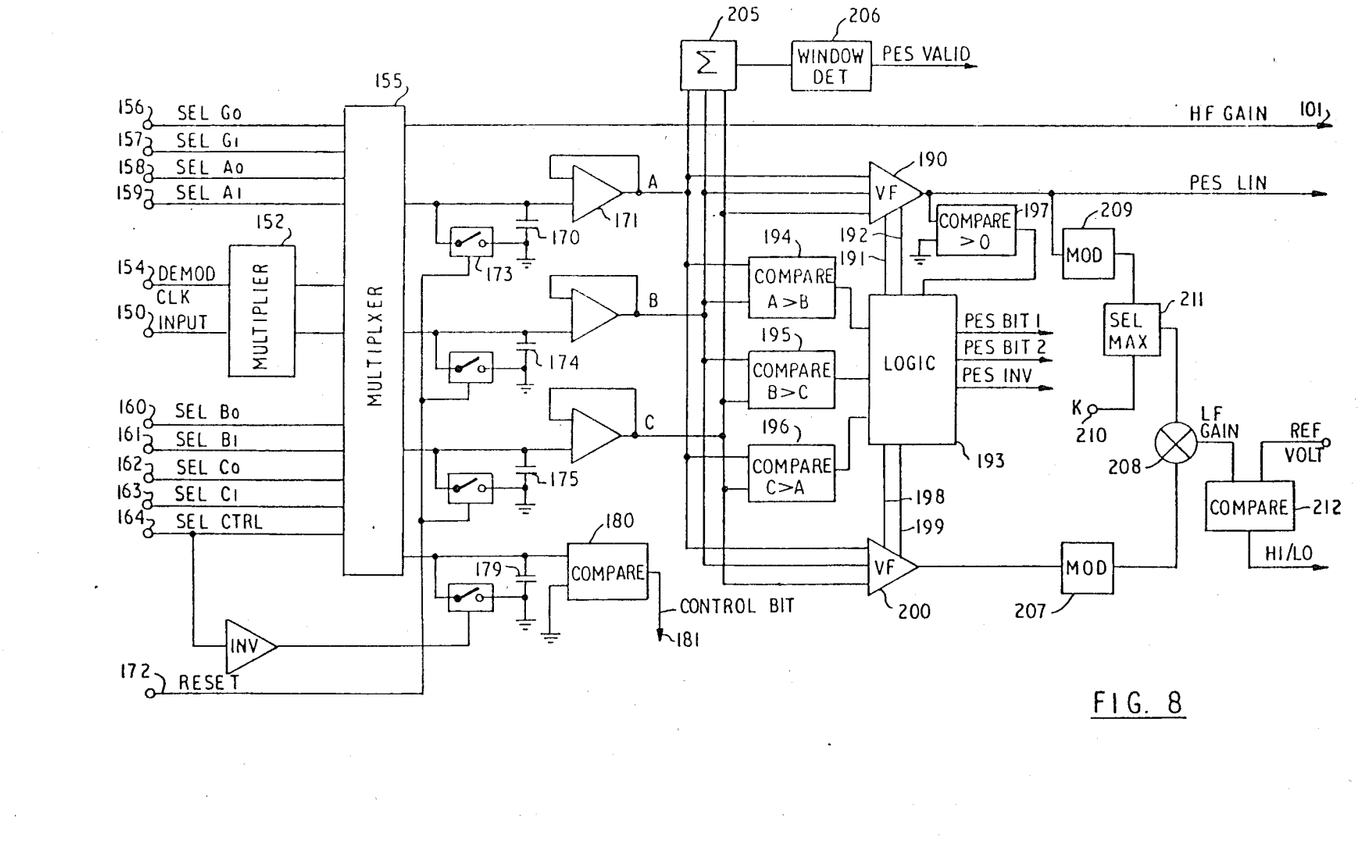
FIG. 8 is a schematic block diagram of a demodulator circuit forming part of head positioning system of FIG. 6.

Signals from one of the transducing heads, such as head 40, available at a terminal 73, are applied on line 74 to a variable gain amplifier 75. After being filtered to remove noise in filter 76 the head signals are further amplified in amplifier 77 and applied both to a zero crossing detector 78 and a demodulator 80. The basic purpose of the demodulator, as will be further described in connection with FIG. 8, is to derive, from the position reference information portions of the input signal, a position error signal, as shown in FIG. 5, which varies linearly with off-track displacement of the selected transducing head. However, before the demodulator is enabled, the presence of a servo sector must first be recognized by detection of a Mark 21 at the start of the servo sector.

Referring back to FIGS. 3 and 4, the characteristic of a Mark which distinguishes it from other signals recorded on the medium is a uniquely timed interval between two negative going zero crossings 54 of the waveform of FIG. 4. The Mark also includes a subsequent zero crossing 55 at normal spacing from the latter of the two zero crossings 54.

The Mark is detected by Mark Detect logic 81 in response to a correctly spaced succession of negative going zero crossings. Zero crossings are detected by zero crossing detector 78 whose output changes level upon the occurrence of a negative going zero crossing and is reset at a predetermined positive threshold. The Mark Detect logic is clocked by signals derived from the output of a phase locked oscillator 83. The oscillator output is applied to the Mark Detect logic by a two-way switch 84 which is operated by a signal, "Enable Mark Detect", generated by timing circuitry shortly before the start of every sector. If a Mark is present, a signal "Mark Found" is produced on line 85.

Figure 7:
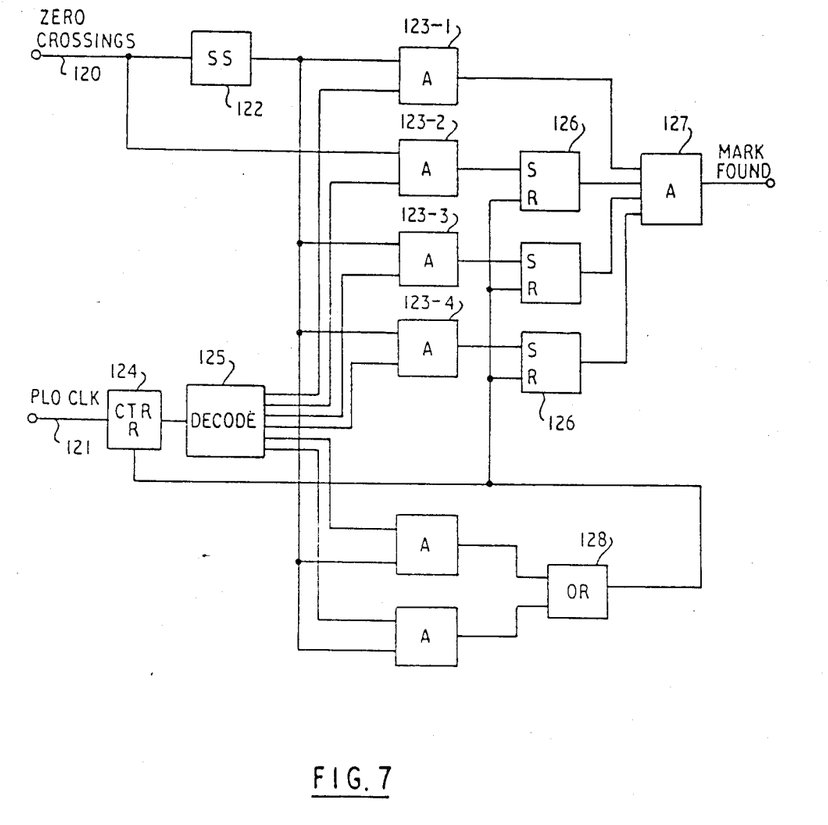
FIG. 7 is a schematic circuit diagram of a mark detection circuit employed in the system of FIG. 6.

The Mark Detect Logic 81 is shown in greater detail in FIG. 7. Zero crossing indications from circuit 78, are received on a line 120 and the PLO output from switch 84 is received on line 121. The zero crossing signal is applied to a single shot 122, which is triggered by negative going crossings, and to one of AND circuits 123. The PLO output is counted by a counter 124 and a decode circuit 125, produces a series of gating windows in response to the contents of the counter. Two of these gating windows gate pulses from single shot 122 through gates 123-3 and 123-4 to set a pair of latches 126 in response to the first and second zero crossings 54 of the Mark. One of the gating windows also enables AND 123-2 to set another latch 126, providing the zero crossing indication on line 120 is "UP", confirming the absence of a zero crossing between crossings 54. When all three latches have been set, the next zero crossing indication on line 120 causes a further AND circuit 123-1 to satisfy AND circuit 127 which produces the Mark Found signal. If an incorrectly positioned zero crossing is detected, the Mark Detect logic is reset immediately by a pulse from OR 128. Otherwise, it is reset after a Mark has been detected by the next zero crossing of the Gain field.

If the Mark is genuine, the two Mark Confirm bits 23 will follow after a predetermined interval and will have the predetermined opposite phase relationship shown in FIGS. 3 and 4. At the end of the predetermined interval, demodulator 80, as will be explained later, demodulates the head signal to produce a pair of Control bits which are read out into shift register 87. If these bits have the required phase reversal as determined by a decoding circuit 88, a "Mark Confirm" signal is produced on line 89.

The phase locked oscillator 83 is conventionally phase locked to the Mark Confirm signals. The output of the oscillator is counted by counter 90 whose output is decoded by a decoder 91. The decoder produces a number of outputs of bus 92 to time various operations of the head positioning system and of the disk file. One of these is the "Enable Mark Detect" signal applied to switch 84. Another output, on line 93, is fed back for phase comparison with the Mark Confirm signals and the phase difference between the two signals is used to control the frequency of the PLO 83 in conventional manner. The PLO 83 has to provide stable multiple outputs for various purposes so that its response to any phase shift is relatively slow. It is thus locked to the Mark Confirm signals in frequency but not always in phase. Consequently, the output from PLO 83 may not be accurately enough in phase with the signals from any individual sector to time the synchronous demodulation of the gain and position reference information by demodulator 80.

For this reason, a further oscillator 95 is provided which may be stopped and started as desired. During a data sector, the oscillator 95 is synchronized to a submultiple of the PLO output frequency by way of switch 84 and a divider 96. Upon the occurrence of the Enable Mark Detect signal on line 94, the synchronizing input is removed by operation of switch 84 and the oscillator is stopped.

As soon as a Mark is detected by circuit 81, the Mark Found signal causes oscillator 95 to restart exactly in phase with the particular sector. The oscillator then free runs at the previously synchronized frequency and produces a pulse train known as the Demodulator Clock (FIG. 9) which is applied to demodulator 80. The oscillator output is also applied to a programmable read only memory (PROM) 97 together with the Mark Found signal. The PROM 97 generates selection windows (FIG. 9) for the various synchronous demodulation operations performed by demodulator 80 as will now be described with reference to the schematic circuit diagram of FIG. 8 and the waveform diagrams of FIGS. 5, 9 and 10.

FIG. 8 is a schematic block diagram of the demodulator 80 of FIG. 6. The linear input signal from amplifier 77, FIG. 6, is applied, in FIG. 8, on line 150 to a multiplier 152. The Demodulator Clock signals from start/stop oscillator 95 are also applied to the multiplier on line 154. A typical Demodulator Clock waveform 250 and a representative portion 263 of the input signal on line 150 are shown in FIG. 9. The effect of multiplying the Demodulator Clock by the input signal portion 263 is to produce a rectified version of the input signal, shown as waveform 264 in FIG. 9.

The multiplier output signals are routed by a multiplexer 155 to one of a number of outputs in accordance with Selection Signals applied on lines 156–164 corresponding to the output lines from PROM 97, FIG. 6. Typical pairs of selection signals are shown as waveforms 251–259 each pair identifying a respective portion of the rectified sector signals to be integrated.

In the example discussed above, the presence of signals SEL $A_o$ and SEL $A_1$ (waveforms 258 and 259, FIG. 8) on the lines 158 and 159 indicates that the linear input signal 263 currently applied to the multiplier 152 is derived from the A-phase position reference information 27. Accordingly, the multiplexer 155 directs the rectified signal 264 to an integrator which integrates the successive cycles as shown in waveform 265, FIG. 9. A further integration of the signals from the second A-phase region 28 is performed in similar manner and the sum of the integrated signals then represents the head position with respect to the A-phase position reference information for that particular sector. This value corresponds to a point on the waveform A of FIG. 5.

The integrator for producing the A-phase signal comprises a capacitor 170 which is charged by a current source within the output stage of multiplexer 155. A voltage follower 171 buffers the voltage produced on the capacitor. The integrator is reset by means of a switch 173 in between samples. The reset signal on line 172 is produced by PROM 97, FIG. 6 and is the inverse of Mark Found. Similar capacitors 174 and 175 are employed to integrate the linear input signal portions derived from the B and C—phase position reference information to produce corresponding position error signals which lie on the waveforms B and C of FIG. 5. The selection signals SEL $B_o$, SEL $B_1$, and SEL $C_o$, SEL $C_1$ are shown as waveforms 256, 257 and 254, 255 in FIG. 9.

Besides the position reference information, the linear input signal also comprises Gain reference information from field 22. This information is also rectified by multiplication of the corresponding portion of the input signal by the Demodulator Clock waveform in multiplier 152. Selection signals SEL $G_o$, SEL $G_1$ cause the respective rectified signal portions to appear as an output current "HF Gain" at the appropriate outputs of multiplexer 155.

The Gain information is not integrated by the circuit of FIG. 8. Instead, the rectified gain signal HF Gain is output on line 101 and its integration is effectively performed in the comparator circuit 102 (FIG. 6) as will be described below.

The Control information, it will be recalled, consists of a short sequence of transitions, of which certain ones, occurring at predetermined times within a sector correspond to bits of control information. The corresponding signal portions (Ref. FIG. 4) are selected by the signal SEL CTRL (waveform 253, FIG. 9) and multiplied by the Demodulator Clock in multiplier 152. The predetermined interval between the significant transitions is such that the sense of the corresponding output pulses is not altered by the multiplication. Thus the output pulses are positive or negative according to the value of the recorded control bit. Each control bit output pulse is integrated by a capacitor 179. The voltage on the capacitor is positive or negative according to the value of the bit and is compared with Ground in a comparator 180. The output of the comparator on line 181 corresponds to the input line to shift register 87, FIG. 6. The capacitor 179 is reset whenever the signal SEL CTRL on line 164 goes negative.

Considering now the further processing of the three position error signals A, B and C, it was pointed out in connection with FIG. 5 that each of these signals is accurately linear for ±¼ track about its zero crossings. Consequently, a linear signal from one of the three phases can always be selected for any position of the head. A composite linear position error signal, PES LIN, as shown in waveform 62 of FIG. 5, is produced from the three phase position error signals A, B and C by a switchable voltage follower 190.

Figure 10:
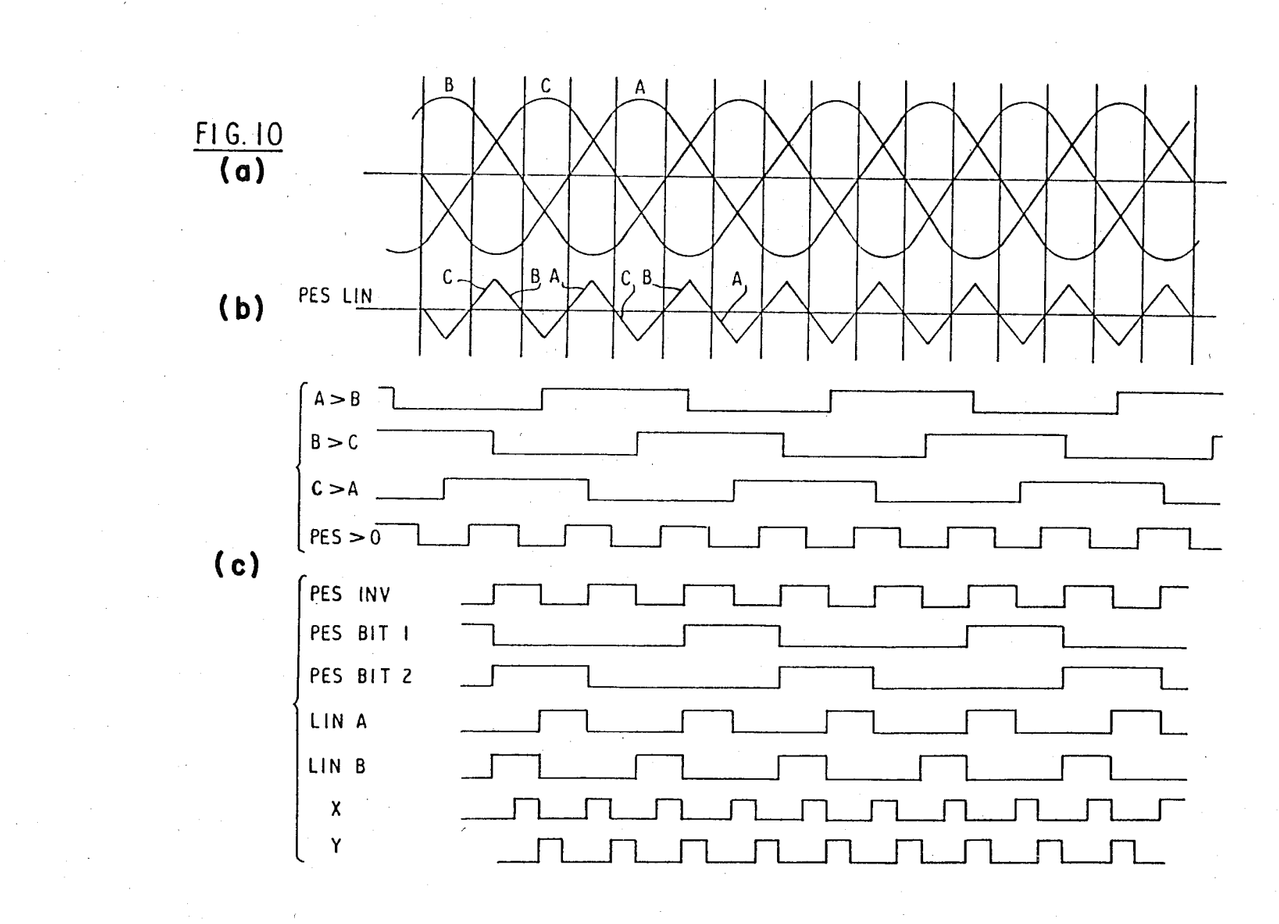
FIG. 10 shows in (a) the three phase position error signals of FIG. 5(a), in (b) the composite error signal of FIG. 5(b), and in (c) the various logic signals as identified and shown for their corresponding circuit elements in FIG. 8.

The switching of voltage follower 190 is controlled by signals LINA and LINB, as shown in FIG. 10, on two of the output lines 191 and 192 of a combinatorial logic circuit 193. This logic circuit not only switches the voltage follower 190 to provide the signal PES LIN but also provides the signals PES BIT 1, PES BIT 2 and PES INV as shown in FIG. 10. The first two of these signals identify which of the three track types the signal PES LIN is derived from at any given position. The third signal PES INV indicates whether the slope is positive or negative. These signals contain sufficient information together with the signal PES LIN, to determine the position of the head over an extended range of three tracks.

However, during normal track following operations, such an extended determination of position is not necessary and, as shown in FIG. 6, the signal PES LIN is applied directly to a phase compensator 99 whose output is applied to a driver amplifier 100. The amplifier 100 drives the head positioning motor 72 in such a way as to tend to reduce the linear position error signal to zero.

Returning again to FIG. 8, the inputs to the logic circuit 193 are provided by four comparators 194–197. Comparators 194, 195 and 196 compare the three phase position error signals A, B and C with each other to determine when the conditions A>B, B>C and C>A respectively are satisfied. The binary waveforms resulting from these comparisons over a number of tracks are shown in FIG. 10. The fourth comparator 197 determines when the signal PES LIN is greater than zero and feeds this back to the logic circuit 193. The output waveform from this comparator also is shown in FIG. 10.

From these inputs, the logic circuit 193 produces the outputs shown in FIG. 10, namely the signals PES INV, PES BIT 1, PES BIT 2, LINA, LINB, and two further waveforms X and Y identifying the quarter track points. The relationship of each of these signals with the three phase position error signals A, B and C is evident from an inspection of FIG. 10. The signals X and Y are applied on lines 198 and 199 to switch a further voltage follower 200 for purposes to be explained below.

A useful check on the validity of the position error signal is provided by summation circuit 205. To a good approximation, the sum of the three phase signals A, B and C should be zero at all positions of the head. This sum is produced by circuit 205 and is compared with a voltage window centred on zero volts in window detect circuit 206. If the sum is within the window a signal, PES VALID, is produced. The absence of this signal indicates a fault in the position reference information on the medium.

The remaining portions of FIGS. 6 and 8 are concerned with the automatic control of the gain of variable gain amplifier 71 by means of the signal HF GAIN and a further signal LF GAIN.

In the channel of FIG. 6, the full width response of the head is represented by the magnitude of the HF GAIN current signal. As described above this signal is derived from the Gain Reference information 22, preceding the position reference information. Because the radial bars 41 of alternating polarity (FIG. 3) which make up the Gain Reference information are uninterrupted radially, the output of the head necessarily represents the full width response from a particular head. The HF GAIN current is compared in a comparator 102 with a reference current on line 103 by applying both currents to an integrating capacitor 104 through a switch 105. The switch is closed by a signal "Enable Gain Adjust" produced on output line 98 of bus 92 at a time corresponding to the detection of the Gain Reference information by the head. Any difference between these currents charges the capacitor 104. The voltage on capacitor 104 is filtered in an R-C filter and is applied to control the gain of the variable gain amplifier 75 so as to normalise the amplitude of the output signals from the head arriving on line 74. The feedback loop formed by line 101 and comparator 102 is a high frequency gain control loop of sufficiently high bandwidth (of the order of a few thousand Hertz) for automatic gain control to be effected within the same sector.

The problem with such conventional automatic gain control, as far discussed above in connection with FIG. 11 is that it does not correct for and may even exacerbate variations in off-track response between heads. Off-track response is the gain or slope of the position error signal derived from a particular head as it moves off-track.

As discussed above, excessive variation in off-track gain can produce under or over-correction and instability in a high density track-following servo system where the highest possible track following loop gain is needed to position the head very accurately over the selected track and to minimise off-track deviations. Off-track gain variation can also cause problems in track accessing servo systems, such as that described in European Published Patent Application No. 0013326 where sampled position error signals are compared with a continually available model position error signal of the same general form. It is important that the sampled position error signals are linear and of substantially constant off-track gain, irrespective of which of a number of transducing heads on different disk surface they come from.

The problem is overcome, in the system of FIG. 6, by adjustment of the reference current applied on line 103 to the comparator 102. The amount of the adjustment is dependent upon the magnitude of the "LF GAIN" signal derived in demodulator 80 which represents the position error signal slope, and upon additional feedforward, or predictive, inputs.

The LF GAIN signal is produced by the remaining circuitry of FIG. 8 as will now be described. Essentially the LF GAIN signal is a measurement of the rate of change of the linear position error signal per track of displacement, i.e. of its slope or off-track gain and is substantially independent of the width of a particular head. By combining selected portions of the three phase signals A, B and C, FIG. 5, a signal approximating closely to this measurement can be provided at any position of the head relative to the tracks. By using stored information on the width of each individual head, the accuracy of the approximation can be increased further and the resulting LF GAIN signal waveform is shown at 63 in FIG. 5.

To understand how the LF GAIN signal is produced, it is instructive to consider the three phase waveforms shown in FIG. 5. If these had the ideal form of dotted line 60, then the amplitude of the flat top portion of each phase would represent the position error signal magnitude at a displacement of half a track, Tw/2, from the data track centre. Since one of the three phases would always be a maximum at every head position, the measurement required would be a simple matter of selecting the appropriate invariant phase and inverting as necessary.

However, as can be seen, the signals A, B and C are rounded and non-linear near to their peaks. Nevertheless, an approximate measurement of the Tw/2 value can be obtained, at any head position, by adding the moduli of the two more linear of the three phase signals together. For example, at the quarter track positions such as 64 in FIG. 5, the A and B phases are more linear than the C phase. Adding the amplitudes of the A and B signals, which are exactly equal to Tw/4, gives an accurate measurement of Tw/2, represented by point 65 on waveform 63. At other positions than the quarter track positions, one of the two phase signals will be outside its linear range of $\pm\frac{1}{4}$ track and addition of the two phase amplitudes will not be so accurate. Accuracy will be lowest at the on-track positions. The locus of the sum of the moduli of the two most linear position signals includes the curved portions 66 of waveform 63 and the dotted portions 67, as illustrated.

Since the on-track positions are the most likely positions for the head to be located during track following operations, it is important to correct for the potential inaccuracy in this region. This is achieved by the addition of a constant voltage, K, to the modulus function in a narrow region close to each track centre.

A portion of the modulus function is generated by the voltage follower 200. This responds to selection signals X and Y on lines 198 and 199 by outputting a different one of the A, B or C signals every quarter track. The signal chosen is the larger of the two more linear signals within that quarter track. The output of the voltage follower is shown in the lower waveform of FIG. 5. This signal is applied to modulus circuit 207, FIG. 8, which inverts negative portions as shown by the dotted lines. The output of the modulus circuit 207 is the upper envelope 68 and is applied to a summing junction 208.

The other portion of the gain function is derived from the linear position error signal PES LIN (waveform 62, FIG. 5) output by voltage follower 190. This is rectified by modulus circuit 209 and if added to waveform 68 would produce the approximate gain measurement function defined by signal portions 66 and 67. However, it is firstly compared with the correction voltage, K, which is provided at a terminal 210. A maximum select circuit 211 selects whichever is the greater of waveform 62 and the voltage K and applies the resulting waveform 69 to summing junction 208. In this way the correction value is only applied when the deviation from linearity of one of the signals being combined exceeds a predetermined amount.

The two waveforms 68 and 69 are summed in junction 208 to produce the desired gain measurement signal 63. Finally, the LF GAIN signal is compared with an accurate reference voltage in the comparator 212 to produce a binary output indicating whether the signal is higher or lower than an accurate reference voltage.

Referring again to FIG. 6, the LF GAIN Hi/Lo signal, as has been indicated above, is fed back to adjust the reference current applied to line 103 with the object of standardizing the off-track response of all the heads. This feedback loop is of insufficiently high bandwidth to correct the gain during the same sector in which the gain measurement was made but is effective to adjust the gain over a number of sectors.

The binary Hi/Lo signal is applied on line 110 to a digital filter 111 which responds to a succession of Hi or Lo pulses by incrementing or decrementing a 4-bit UP/DOWN counter 112. The number stored in the counter 112 represents digitally the adjustment to the reference current on line 103 necessary to restore the gain function LF GAIN to the reference voltage, which is derived from reference voltage source 113. The 4-bit count in counter 112 is applied on bus 114 to a digital to analog converter 115 and converted to a current on line 103. The digital to analog converter 115 also derives its internal constant current reference from the reference voltage source 113.

Two other inputs to the D/A converter 115 can also affect the reference voltage adjustment. Both of these are derived from externally supplied information on bus 116 indicating which head is to be selected. This information is applied to a store 117 which may be a read only memory or part of a microprocessor. Because of differences in flying height between inner and outer regions of the disk, it can be predicted that there will be differences in the off-track response of heads which operate over different radial bands. The radial band over which a selected head flies is indicated by the least significant bits of its address. In response to these bits, the store 117 produces a predictive digital output on line 118 which is also applied to D/A converter 115 to adjust its output accordingly. Because no feedback is employed, this correction helps to achieve a faster adjustment of gain than would be achieved by relying on the LF gain control loop alone.

A similar direct adjustment is made for known variations in width between heads, since it is known that the degree of rounding of the position error signal depends on head width. The store 117 is responsive to the head address information to provide to the D/A converter 115, on a bus 119, a digital adjustment value related to the width of the selected head. Again, because no feedback is employed, this predictive technique helps to achieve a faster adjustment of gain.

The head width adjustment from store 117 is also applied to a digital to analog circuit 120 which generates from it one of three possible analog values for the voltage K for provision to terminal 210, FIG. 8, to further improve the accuracy of the gain measurement 63.

We claim:
1. A head positioning system with automatic gain control, for use with disk surfaces, comprising:
 a head positioning actuator for moving at least one transducing head transversely of concentric information storage tracks on one of the disk surfaces;
 position reference information on one of the disk surfaces for defining the radial position of the information storage tracks, the position reference information having a circumferentially extending and radially repeated pattern including at least two radially offset subsets of servo elements, the servo elements in each subset being circumferentially and radially aligned and arranged such that certain of the boundaries between radially adjacent circumferential rows of elements are aligned with the information storage track centres;

a transducing head, movable by the actuator, for detecting the position reference information and for producing, for each of the subsets of servo elements passing beneath the head, a corresponding servo signal whose peaks are generally representative of the radial position of the head;

a variable gain amplifier for amplifying the servo signals from the transducing head;

means responsive to the amplified servo signals from the variable gain amplifier for generating, for each amplified servo signal corresponding to a respective subset of servo elements, a position error signal which is a linear function of radial position of the head over a portion of the radial width of a row of servo elements, the different position error signals corresponding to the respective subsets of servo elements being phase related;

means for generating, from the different phase position error signals, a composite position error signal, the composite position error signal being comprised of selected linear portions of each of the different phase position error signals;

feedback means for feeding back the composite position error signal to control the head positioning actuator;

means for generating a gain function for the variable gain amplifier, the gain function generating means including means for selecting from the different phase position error signals certain of those phase position error signals which are generally within their linear range and for combining said selected phase position error signals to form a portion of the gain function; and and a gain control feedback for controlling the gain of the variable gain amplifier in dependence on the gain function.

2. A system as claimed in claim 1 further including means for detecting when one of the phase position error signals deviates from linearity by a predetermined amount, and means responsive to the detecting means for generating a correction signal to the gain function generating means for combination with said selected phase position error signals.

3. A system as claimed in claim 2 in which the transducing head for detecting position reference information is one of a plurality of such heads whose sensitive widths in a direction transverse to the tracks may vary from head to head, the system further including a store responsive to head address information to provide a first output signal whose value is related to the width of the selected head, the correction signal generating means being responsive to the first output signal to vary the correction signal by a predetermined amount.

4. A system as claimed in claim 3 in which the first output signal from the store is also applied directly to the gain control feedback.

5. A system as claimed in claim 3 in which the plurality of heads are divided into inner and outer groups, the store being responsive to the head address information to provide a second output signal, indicative of whether the selected head is an inner or an outer head, directly to the gain control feedback.

6. A system as claimed in claim 1 in which the position reference information is located in servo sectors on the disk, the servo sectors being interspersed with data sectors in which the information storage tracks are located, each servo sector comprising gain reference information preceding the position reference information and detectable by the transducing head, the system further comprising a gain reference information amplitude detector whose output is a measure of the full width response of the transducing head to information signals on the disk, and means for combining the output from the gain reference information amplitude detector with the gain function to control the gain of the variable gain amplifier.

7. A system as claimed in claim 1 in which the gain function generating means includes at least one modulus circuit and combines only the modulus values of the different phase position error signals.

8. A system as claimed in claim 7 in which there are three phases of position reference information, the corresponding position error signals each having nominally linear and non-linear regions such that two of the three are nominally linear when the third is non-linear the system including phase comparison means for comparing the magnitudes of the three phase position error signals and selection logic responsive to the outputs of the phase comparison means to generate selection signals, the gain function generating means being reponsive to the selection signals to combine only those pairs of phase position error signals which are in their nominally linear regions.

9. A system as claimed in claim 8 in which the gain function generating means includes two switching circuits to each of which the three phase position error signals are applied, the switching circuits each being responsive to selection signals from the selection logic to output different respective ones of the three phase position error signals, the selection logic being arranged to select sequentially a different one of the three phase position error signals at each quarter track position.

10. A system as claimed in claim 9 in which the output of one of said switching circuits is the composite position error signal, and in which the correction means includes a maximum value selection circuit to which a constant amplitude correction signal and the modulus of the composite position error signal are applied, the maximum value selection circuit passing whichever is the greater of these two signals to the gain function generating means for combination with the phase position error signal selected by the other switching circuit.

* * * * *